United States Patent
Gauthier et al.

(10) Patent No.: US 10,928,810 B2
(45) Date of Patent: Feb. 23, 2021

(54) METHOD FOR MONITORING AN OPTICAL LENS MANUFACTURING PROCESS

(71) Applicant: Essilor International, Charenton-le-Pont (FR)

(72) Inventors: Ronald Gauthier, Charenton-le-Pont (FR); Stephane Gueu, Charenton-le-Pont (FR); Benoit Cazal, Charenton-le-Pont (FR); Isabelle Simon, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/074,507

(22) PCT Filed: Jan. 27, 2017

(86) PCT No.: PCT/EP2017/051731
§ 371 (c)(1),
(2) Date: Aug. 1, 2018

(87) PCT Pub. No.: WO2017/133970
PCT Pub. Date: Aug. 10, 2017

(65) Prior Publication Data
US 2019/0049936 A1    Feb. 14, 2019

(30) Foreign Application Priority Data

Feb. 5, 2016 (EP) .................................... 16305136

(51) Int. Cl.
*G05B 19/418* (2006.01)
(52) U.S. Cl.
CPC ............... *G05B 19/41875* (2013.01); *G05B 2219/31205* (2013.01); *G05B 2219/31206* (2013.01); *G05B 2219/45157* (2013.01); *Y02P 90/02* (2015.11)

(58) Field of Classification Search
None
See application file for complete search history.

(56) References Cited

U.S. PATENT DOCUMENTS

2003/0123026 A1\* 7/2003 Abitbol ............... G02C 13/003
                                                                  351/204
2009/0325693 A1   12/2009 Ron
(Continued)

FOREIGN PATENT DOCUMENTS

WO    WO 2014/173781 A1    10/2014

OTHER PUBLICATIONS

International Search Report dated Apr. 10, 2017, in PCT/EP2017/051731, filed Jan. 27, 2017.

*Primary Examiner* — Ryan A Jarrett
(74) *Attorney, Agent, or Firm* — Oblon, McClelland, Maier & Neustadt, L.L.P.

(57) ABSTRACT

A method for monitoring an optical lens manufacturing process at a first lens manufacturing side, the method including: a manufacturing data collecting, during which sets of manufacturing data indicative of at least a manufacturing process parameter and/or a manufacturing device parameters and/or an operator parameter and/or an environment parameter at the first lens manufacturing side are collected; a manufacturing information generating, during which at least one manufacturing information indicative of at least a manufacturing process parameter and/or a manufacturing device parameters and/or an operator parameter and/or an environment parameter at a second lens manufacturing side is generated based on the collected manufacturing data.

18 Claims, 3 Drawing Sheets

(56) References Cited

U.S. PATENT DOCUMENTS

| | | |
|---|---|---|
| 2010/0198381 A1 | 8/2010 | Feldman |
| 2014/0236515 A1 | 8/2014 | Ho et al. |
| 2016/0008943 A1 | 1/2016 | Suzue et al. |
| 2016/0046090 A1 | 2/2016 | Allione et al. |
| 2017/0274490 A1* | 9/2017 | Mechrez .......... B29D 11/00942 |

* cited by examiner

METHOD FOR MONITORING AN OPTICAL LENS MANUFACTURING PROCESS

FIELD OF THE INVENTION

The invention relates to a method for monitoring an optical lens manufacturing process, a monitoring device for monitoring an optical lens manufacturing process, a lens manufacturing device, a lens measuring device and a monitoring system configured for monitoring an optical lens manufacturing process.

BACKGROUND OF THE INVENTION

Optical lenses, and in particular ophthalmic lenses, require very high quality standard, therefore very high quality manufacturing method is to be used in order to obtain high quality optical lenses.

In order to guarantee very high quality manufacturing, one method consists in controlling the process.

As disclosed in EP2214868, the manufacturing process itself may be controlled by checking the quality of a specific master lenses that may be produced periodically and by following over time at least one parameter of the manufactured master lens.

One object of the present invention is to provide a new method for monitoring an optical lens manufacturing process which eliminates the current limitations providing manufacturing data by anticipation and from worldwide experience.

SUMMARY OF THE INVENTION

To this end, the invention proposes a method for monitoring an optical lens manufacturing process at a first lens manufacturing side, the method comprising:

a manufacturing data collecting step, during which sets of manufacturing data indicative of at least a manufacturing process parameter and/or a manufacturing device parameters and/or measuring device parameters and/or an operator parameter and/or an environment parameter at the first lens manufacturing side are collected, a manufacturing information generating step, during which at least one manufacturing information indicative of at least a manufacturing process parameter and/or a manufacturing device parameters and/or an operator parameter and/or an environment parameter at a second lens manufacturing side is generated based on the collected manufacturing data.

Advantageously, the method of the invention allows generating manufacturing information for a second lens manufacturing side based on manufacturing data from a first manufacturing side.

For example, the method according to the invention may use the experience acquired at a first manufacturing side to increase the quality of the manufactured optical lenses at a second lens manufacturing side.

The current method for controlling may have delay between the measurements and the integration of the results into the manufacturing parameters and the data are gathered at a single manufacturing side.

The method according to the invention may be implemented by gathering a great amount of data from a plurality of manufacturing sides and other entities so as to provide manufacturing information to be used at a specific manufacturing side.

Therefore, the method according to the invention may provide a more reliable method to assure the quality of the manufactured lenses than the prior art methods.

According to further embodiments which can be considered alone or in combination:

the first and second lens manufacturing sides are the same; and/or during the manufacturing data collecting step sets of manufacturing data are collected from a plurality of lens manufacturing sides; and/or during the manufacturing information generating step the at least one manufacturing information is generated using statistical analysis of the collected manufacturing data; and/or at least part of the manufacturing data collected during the manufacturing data collecting step are senses by a network of sensors at the first manufacturing side; and/or at least part of the manufacturing data collected during the manufacturing data collecting step are measured using measurements devices, such as a lens mapper or focimeter, and/or the method further comprises a manufacturing information processing step during which the manufacturing information is processed to generate an alert and/or a recommendation and/or an activation parameter; and/or during the manufacturing information generating step the at least one manufacturing information is generated using statistical analysis of the collected manufacturing data and allows to generate an alert and/or a recommendation and/or an activation parameter by anticipation; and/or the manufacturing information processing step is realized by using statistical analysis as data mining for pattern detection and/or machine learning and/or artificial intelligence in order to generate an alert and/or a recommendation and/or an activation parameter by anticipation; and/or the manufacturing information processing step is realized by using machine learning such as supervised learning, semi-supervised learning and unsupervised learning such as artificial neural network, association rule learning, hierarchical clustering, cluster analysis and outlier detection; and/or the manufacturing data further comprise sets of yield data indicative of at least a yield at each manufacturing side and during the manufacturing information generating step the at least one manufacturing information is generated based on the collected yield data; and/or the yield is obtained by comparing a quality parameter, for example the roughness of the lens, the aspect of the lens or the satisfaction of the wearer, with a requirement, a standard or with predetermined metes and bounds; and/or the yield is a throughput yield measuring the ability of the process to produce defect-free units; and/or the yield is a yield to put which indicates the rate of return to the investor; and/or the method further comprises a target yield providing step, during which at least a target of yield of the optical lens manufacturing process at the second lens manufacturing side is provided and during the manufacturing information generating step the at least one manufacturing information is generated based on the target yield; and/or the yield provided during the yield providing step and/or the yield target relate to yields in terms of quality of the optical lenses produced and/or quantity of optical lenses produced and/or cost of production and/or time of production; and/or the method further comprises an additional data collecting step during which additional data provided by an additional side different from the first and second manufacturing side are collected and wherein during the manufacturing information generating step the additional data is considered when generating the at least one manufacturing information; and/or the manufacturing data are indicative of at least one parameter of the tools, for example manufacturing and/or edging and/or blocking, used at one of the lens manufacturing sides; and/or the manufacturing data are indicative of at least one parameter of the optical lenses, for example material and/or type of lens blank and/or optical function, manufactured at one of the lens manufacturing sides; and/or the manufacturing data are indicative of at least one parameter of the optical lens determining means, for example optimization method, processing method, software, used for determining the optical lenses manufactured at one of the lens manufacturing sides; and/or the manufacturing data are indicative of at least one parameter of the environment at one of the lens manufacturing sides, for example the ambient air temperature, the ambient humidity.

The invention further relates to a monitoring device configured for monitoring an optical lens manufacturing process at a first lens manufacturing side, the device comprising:

communication unit configured to receive from at least a first lens manufacturing side sets of manufacturing data indicative of at least a manufacturing process parameter and/or a manufacturing device parameters and/or an operator parameter and/or an environment parameter at the first lens manufacturing side;

a memory storing computer executable instructions and configured to store the received sets of manufacturing data;

a processor for executing the computer executable instructions, wherein the computer executable instructions comprise instructions for processing the manufacturing data to generate at least one manufacturing information indicative of at least a manufacturing process parameter and/or a manufacturing device parameters and/or an operator parameter and/or an environment parameter at a second lens manufacturing side.

According to further embodiments which can be considered alone or in combination:

the first and second lens manufacturing sides are the same; and/or the communication unit is configured to receive data from a plurality of lens manufacturing sides; and/or the communication unit is further configured to send information data determined by the processor to the second manufacturing side; and/or the communication unit is further configured to receive additional data from an additional side for example, R&D entity, lens retainer, customer evaluation centers, the memory is further configured to store the additional data.

The invention also relates to a lens manufacturing device comprising:

a sensor configured to sense data indicative of at least one parameter of the lens manufacturing device, and a communication module configured to send the sense data indicative of the at least one parameter to a monitoring device according to the invention and/or to a further lens manufacturing device.

According to an embodiment of the invention, the communication module can also get some parameters used by the manufacturing device to send them to a data base.

The communication module of the lens manufacturing device according to the invention may further be configured to communication with a further lens manufacturing device.

The invention further relates to a monitoring system configured for monitoring an optical lens manufacturing process at a first lens manufacturing side, the system comprising:

a sensor network comprising a plurality of sensors arranged to sense manufacturing data indicative of at least a manufacturing process parameter and/or a manufacturing device parameters and/or an operator parameter and/or an environment parameter at the first lens manufacturing side, a monitoring device comprising:
communication unit configure to receive from the sensor network sets of manufacturing data indicative of at least a manufacturing process parameter and/or a manufacturing device parameters and/or an operator parameter and/or an environment parameter at the first lens manufacturing side;

a memory storing computer executable instructions and configured to store the received sets of manufacturing data;

a processor for executing the computer executable instructions, wherein the computer executable instructions comprises instructions for processing the manufacturing data to generate at least one manufacturing information indicative of at least a manufacturing process parameter and/or a manufacturing device parameters and/or an operator parameter and/or an environment parameter at a second lens manufacturing side.

The system according to the invention may further comprising a monitoring device according to the invention and configured to send data indicative of the at least one parameter of the lens manufacturing device to the manufacturing side.

The invention further relates to a computer program product comprising one or more stored sequences of instructions that are accessible to a processor and which, when executed by the processor, causes the processor to carry out the steps of the method according to the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method.

The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1A:
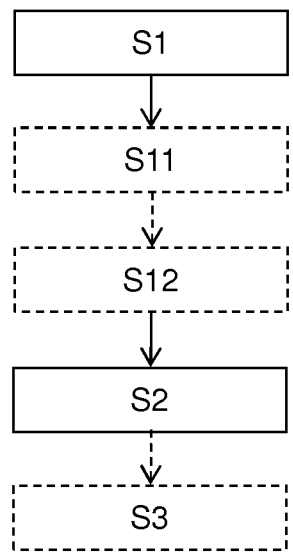
FIG. 1 is an illustration of a chart-flow of a method according to the invention.
FIG. 1b illustrates an example of implementation of the invention.

As illustrated on FIG. 1, the invention relates to a method for monitoring an optical lens manufacturing process at a first lens manufacturing side. The method of the invention comprises:
a manufacturing data collecting step S1, and
a manufacturing information generating step S2.

During the manufacturing data collecting step S1, sets of manufacturing data are collected. The manufacturing data may be indicative of at least a manufacturing process parameter and/or a manufacturing device parameter and/or an operator parameter and/or an environment parameter at the first manufacturing side.

Typically, a manufacturing process comprises the steps of providing a lens blank, blocking the lens blank using a blocking device, machining at least one surface of the lens blank using a machining device, for example a generator or 3D coarse grinding machining device and polishing the machined surface of the lens using a polisher. The lens blank provided during the providing step can be a semi-finished lens blank.

The blocking step can be processed using any blocking devices known from the person skilled in the art.

The machining step consists in providing a desired surface using machining and/or generating and/or surfacing technic on the unfinished surface of the lens so that the finished lens has the desired optical function. Generators are common devices known from the person skilled in the art.

The machining step may further comprise 3D printing so as to obtain the desired surface, for example by printing on an unfinished surface.

The polishing step consists in smoothing the manufactured surface. Polishing devices are well known in the art.

The manufacturing device parameters may relate to any of the devices used in the manufacturing process, such as the blocking device, the generator, the polishing device, for example the speed and/or acceleration of the rotation of a grinding tool or the temperature of the device or the speed or acceleration of translation of the axes of the manufacturing device.

The manufacturing process may further comprise an optical lens determining step during which the optical lens, for example the optical function of the optical lens is determined based at least on the wearer's prescription. The determining step allows obtaining a surface file that is sent to a machining device so as to generate a desired surface on an optical lens to obtain the determined optical function. According to an embodiment, the manufacturing data may be indicative of at least one parameter of the optical lens determining means, for example optimization method, processing method, software, used for determining the optical lenses manufactured at one of the lens manufacturing sides.

The manufacturing process is usually implemented in a manufacturing side, such as a manufacturing lab comprising determining module, manufacturing tools such as blocking, machining, grinding, polishing and eventually edging tools. The tools may be operated by different operators.

The manufacturing process may further comprise an edging step during which the manufactured optical lens is edged to fit a specific spectacle frame.

The manufacturing process may also comprise a coating step during which at least one of the surfaces of the optical lens is coated. Parameters of the coating device may be monitored by the method of the invention.

The manufacturing process may use drones comprising as monitoring device according to the invention, for example to monitor the manufacturing process. Furthermore, the manufacturing process may comprise drones as part of the manufacturing process for example to carry samples, such as optical lenses from one tool to the other. According to such embodiment, the manufacturing data may relate to the drone for example to the traveled distance of the drones.

The operator parameter may relate to the position and/or movements and/or number of the operator of the manufacturing process. The operator parameters may further relate to the fatigue and/or attention level of the operator, using for example connected devices such as watches or head mounted devices.

Advantageously, the operator parameter may be used to monitor the work of each operator either individually or as a group.

Furthermore the operator parameters may be used to identify points of improvement of the overall process so as for example to reduce the level of fatigue of the different operators, or the increase the comfort level of the operators.

The environment parameter may relate to ambient air temperature and/or the ambient humidity and/or composition of the air in the environment in which the manufacturing process is carried out.

Furthermore, the manufacturing data may be indicative of at least one parameter of the optical lenses, for example material and/or type of lens blank and/or optical function, manufactured at one of the lens manufacturing sides.

As detailed below when describing the monitoring system of the invention, at least part of the data collected during the manufacturing data collecting step are senses by a network of sensors at the first manufacturing side.

At least part of the manufacturing device may be senses by measuring device, for example adapted to measure parameters of the manufactured optical lenses. Typically, the measuring device may be a lens mapper or a focimeter.

However, the network of sensors may not be limited to sensors measuring physical parameters but may further comprise input devices used to collect data indicative of at least a manufacturing process parameter and/or a manufacturing device parameters and/or measuring device parameter and/or an operator parameter and/or an environment parameter at the first lens manufacturing side input by a person. For example, the network device may comprise customer feedback collecting sensors collecting feedback from the wearer of the manufactured optical lens.

During the manufacturing information generating step at least one manufacturing information indicative of at least a manufacturing process parameter and/or a manufacturing device parameters and/or an operator parameter and/or an environment parameter at a second lens manufacturing side is generated based on the collected manufacturing data.

For example, during the manufacturing information generating step the at least one manufacturing information is generated using statistical analysis of the collected manufacturing data.

Statistics involves the collection, organization, analysis, interpretation, and/or presentation of measured/collected information. With advances in technology, more extensive and complex computing allows massive amounts of data to be collected, stored and/or processed. Further, methods for evaluating the data are numerous.

Statistical analysis can be employed to process and/or evaluate information sensed such as manufacturing information. The two main types of statistics are descriptive and inferential statistics.

Descriptive statistics includes methods for organizing and summarizing collected data. These methods include, but are not limited to, graphs, tables, charts and measurements such as averages, percentiles, and measures of variation of the data. Data mining for pattern detection, machine learning and artificial intelligence methods, regression modeling and summary statistics can be employed in descriptive statistics.

Inferential statistics is based on methods for making conclusions about data collected based on the evaluation of a sample of the data. For example, predictions can be made regarding the entire set of data. An example prediction can relate to the likelihood that a loss of efficiency of the manufacturing process exists based on data collected. Recommendations can be made to achieve or avoid predictions or to increase efficiency of the manufacturing process.

Statistical methods such as regression analysis can be employed to analyze data. Regression analysis includes techniques for analyzing different variables to determine the relationship between one or more dependent variables and independent variables. For example, the analysis can be employed to determine how the value of a dependent variable changes when a value of one independent variable changes while keeping the values of other independent variables constant. Regression analysis can be employed for prediction and overlaps with the field of machine learning; a branch of artificial intelligence that employs algorithms to identify patterns in data and/or make predictions based on evaluated data. The term machine learning may comprise supervised learning, semi-supervised learning and unsupervised learning such as artificial neural network, association rule learning, hierarchical clustering, cluster analysis, outlier detection and so on.

Different models can be employed in regression analysis to model the relationship between two variables. Linear regression is a type of regression analysis. Linear regression models the relationship between a dependent variable and an independent variable using linear predictor functions. Unknown model parameters are estimated from the data on which linear regression is performed. Interpolation methods can be employed to perform prediction based on values within the set of collected data used for model-fitting while extrapolation can be employed to perform prediction based on values outside the set of collected data.

In linear regression models, the conditional mean of an independent variable given the dependent variable value is typically an affine function. In some cases, the median, or some other quantile of the conditional distribution of the independent variable given the dependent variable is a linear function of the dependent variable.

Non-linear regression is a type of regression analysis in which observed information is modeled by a non-linear function. The non-linear function is a combination of the model parameters and depends on an independent variable.

According to an embodiment of the invention, the first and second manufacturing sides are the same. In other words, the manufacturing data are collected from a given manufacturing process and are then analyzed to determine manufacturing information for the given manufacturing process.

According to a further embodiment of the invention, the first and second manufacturing sides may be different. In other words, the manufacturing data are collected from a given manufacturing process and are then analyzed to determine manufacturing information for a different manufacturing process, for example implemented in a different lab.

Advantageously, the manufacturing information may be used to improve the setting of the second manufacturing process using data collected on a different manufacturing process. For example, a change of a parameter in the first manufacturing process turns out to be either very efficient or on the contrary reduce the quality of the produced lenses, based on the analyses of the data from that first manufacturing data is may be possible to either change the parameter for the second manufacturing parameter or not.

According to an embodiment of the invention, the manufacturing data may be collected from a plurality of lens manufacturing sides. Advantageously, collecting data from a plurality of manufacturing sides helps improve the accuracy of the manufacturing information. Indeed, collecting data from a plurality of different manufacturing sides increases the variety of different configuration of manufacturing process monitored. Such increase in variety of different configurations of manufacturing process monitored enhances the experience curve of the monitoring method of the invention. When data are collected from a plurality of manufacturing sides, the method according to the invention may further comprise a formatting step during which the different data collected are process to be in a common format so as to be analyzed to generate manufacturing information.

According to a further embodiment of the invention of the invention, the manufacturing information can be generated for a plurality of manufacturing sides. For example, the data is collected from 1 to n manufacturing sides and that the manufacturing information is generated for 1 to p manufacturing sides. All or part of the 1 to p manufacturing sides can receive manufacturing information based on the manufacturing data collected on all or part of the 1 to n manufacturing sides.

According to an embodiment of the invention and as illustrated on FIG. 1, the method according to the invention may comprise an additional data collecting step S12. During the additional data collecting step S12 additional data provided by an additional side different from the first and second manufacturing side are collected. The additional side may be a non-manufacturing side such as but not limited to R&D entity, lens retainer, eye care professional, customer evaluation centers, satisfaction surveys, marketing studies, data base, data server. For example, the eye care professional can determine the lens models that obtain the best commercial success or the best rate of customer satisfaction. Thus, the rate of customer satisfaction can be considered as an additional data used to generate manufacturing information that aims to constantly improve the lens quality and the customer satisfaction.

According to such embodiment, during the manufacturing information generating step the additional data is considered when generating the at least one manufacturing information.

The manufacturing data may further comprise sets of yield data indicative of at least a yield at each manufacturing side and during the manufacturing information generating step the at least one manufacturing information is generated based on the collected yield data.

The yield provided during the yield providing step and/or the yield target relate to yields in terms of quality of the optical lenses produced and/or quantity of optical lenses produced and/or cost of production and/or time of production. An example of yield that can be considered is the "yield to put" which indicates the rate of return to on investor. The economical aspect is not the only yield that can be used by the method of the invention.

For example, a quality yield may be based on user feedback. The quality of the produced lens may further be compared with a requirement, a standard or with predetermined metes and bounds. The quality of the lens can consider many parameters such as the roughness of the lens, aspect of the lens, the satisfaction of the wearer and so on. Then, the yield is determined by the ratio of lenses that meet the quality requirements and lenses which don't. An example of these quality yield is the "throughput yield", which measures the ability of the process to produce defect-free units.

As illustrated on FIG. 1 the method of the invention may comprise a target yield providing step S11. During the target yield providing step S11 at least a target of yield of the optical lens manufacturing process at the second lens manufacturing side is provided and during the manufacturing information generating step the at least one manufacturing information is generated based on the target yield.

As illustrated on FIG. 1, the method according to the invention may further comprise a manufacturing information processing step S3. During the manufacturing information processing step S3, the manufacturing information is processed to generate an alert and/or a recommendation and/or an activation parameter.

The manufacturing information could be a recommendation, for example to adapt such parameter or change a worn tool or change an operational procedure. The manufacturing information may also be an alert or a suggestion of using a new service or optical function more adapted to the manufacturing process.

Figure 1B:
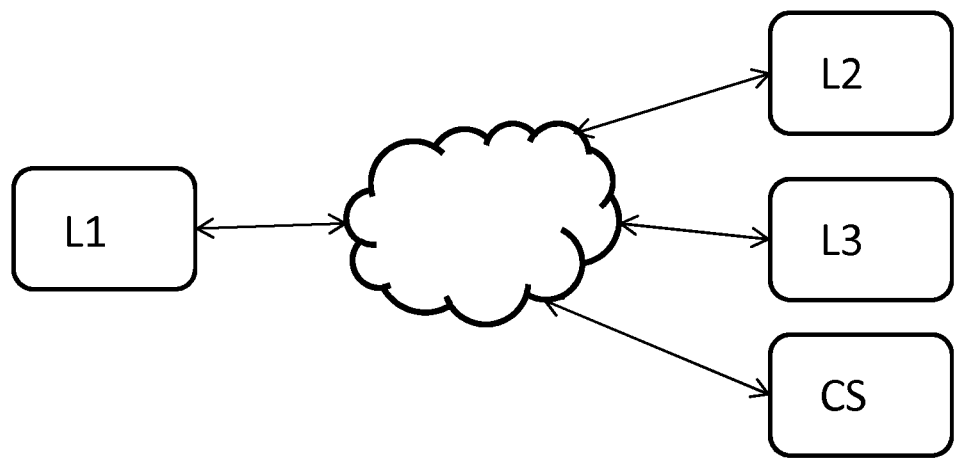

FIG. 1b illustrates an example of implementation of the invention according to which a first ophthalmic lens manufacturing entity, for example a lab L1, that is to manufacture a specific ophthalmic lens may send a configuration request to further manufacturing entities, such as different labs L2 and L3 and eventually a non-manufacturing entity, such as an R&D center or a central service CS. Each of the further manufacturing entities L2 and L3 may be monitored by a method of the invention and based on the sense data manufacturing information may be generated. The information may provide an indication of the quality of the produced ophthalmic lenses in the different manufacturing entities corresponding to the ophthalmic lens to be manufactured by the first manufacturing entity. Based on the generated information, a recommendation of parameters may be provided to the first manufacturing entity. Such recommendation may be provided by the non-manufacturing entity or may be generated by a further entity specifically dedicated to generate such recommendation.

Figure 2A:
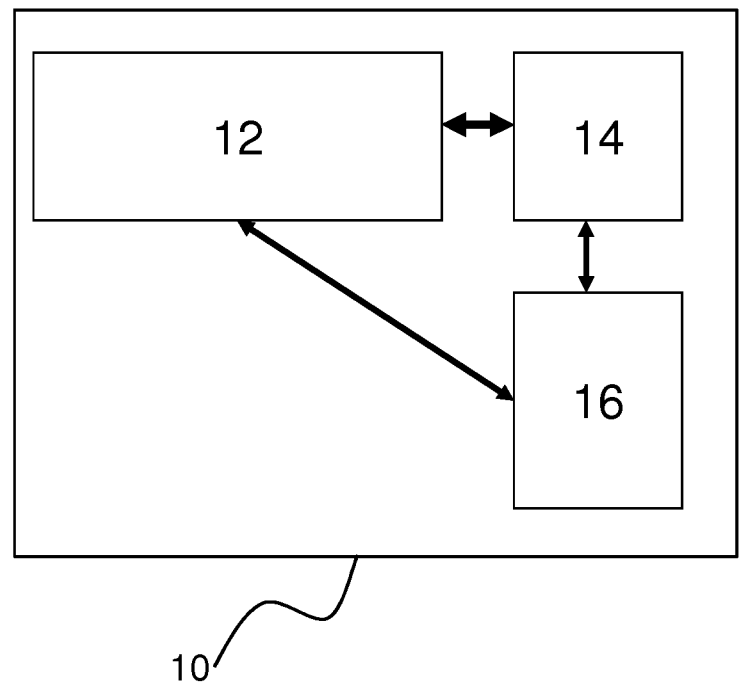
FIG. 2a is a schematic representation of a monitoring device according to the invention.

The recommendation may be to adapt the manufacturing parameters as in the manufacturing entity that has the best quality of may be determined based on the manufacturing parameters of the different entity but not correspond to such manufacturing parameters. As illustrated on FIG. 2, the invention also relates to a monitoring device 10 configured for monitoring an optical lens manufacturing process at a first lens manufacturing side.

The monitoring device comprises:
a communication unit 12,
a memory 14, and
a processor 16.

The communication unit 12 is configured to receive from at least a first lens manufacturing side sets of manufacturing data indicative of at least a manufacturing process parameter and/or a manufacturing device parameters and/or an operator parameter and/or an environment parameter at the first lens manufacturing side. For example, the communication unit 12 is connected to a communication network such as the Internet and arranged to receive data from computing entities such as web servers, files servers, media servers etc. with which the communication unit communicates via any of a number of known protocols, such a hypertext transfer protocol (HTTP).

Furthermore, the communication unit may be configured to receive data from a plurality of lens manufacturing sides. For example, each lens manufacturing side is connected to the communication network.

Furthermore, the communication unit 12 may be configured to receive additional data from an additional side for example, R&D entity, lens retainer, customer evaluation centers, the memory is further configured to store the additional data.

The communication unit 12 may be further configured to receive data from a distant storing entity, such as a distant server with which the communication unit communicate over the internet.

The memory 14 stores computer executable instructions and is configured to store the received sets of manufacturing data. The computer executable instructions comprises instructions for processing the manufacturing data to generate at least one manufacturing information indicative of at least a manufacturing process parameter and/or a manufacturing device parameters and/or an operator parameter and/or an environment parameter at a second lens manufacturing side The processor 16 is configured to execute the computer executable instructions stored in the memory 14.

The communication unit 12 may be configured to send at least part of the generated manufacturing information to the second manufacturing side or a different entity connected to the communication network.

The invention also relates to a lens manufacturing device comprising:
a sensor configured to sense data indicative of at least one parameter of the lens manufacturing device, and
a communication module configured to send the sense data indicative of the at least one parameter to a monitoring device according to the invention The communication module of the lens manufacturing device according to the invention may be configured to communication with a further lens manufacturing device. For example, the different manufacturing devices may be arranged as a neural network increasing the efficiency of data gathering and processing.

Figure 2B:
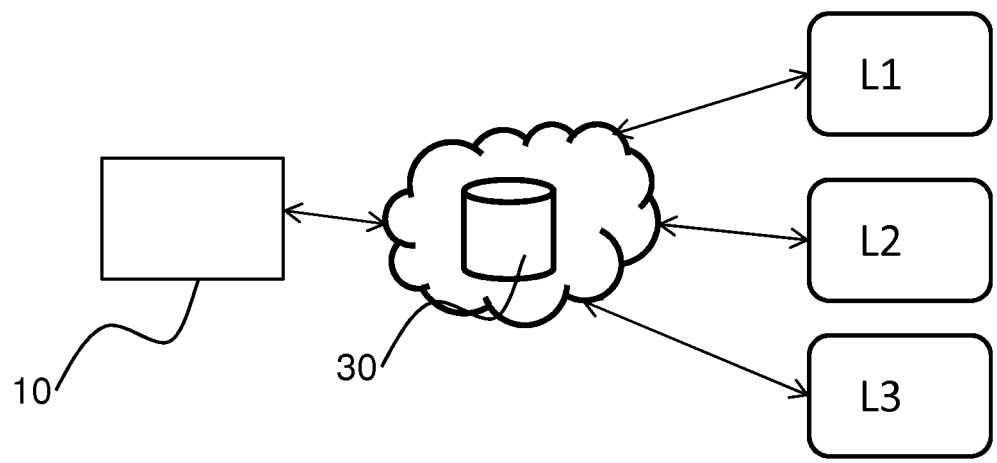
FIG. 2b is a schematic representation of a monitoring system according to the invention.

As illustrated on FIG. 2b, a monitoring device 10 may be arranged to communicate with a distant storing entity 30, such as a server that receives data from different manufacturing sides L1, L2 and L3. According to such configuration each manufacturing side sends data to a distant storing entity. The stored data may be access upon request by a monitoring device 10 according to the invention. Advantageously, such configuration allows providing a great amount of data to be process to generated information without having to request data from each manufacturing side individually.

Figure 3:
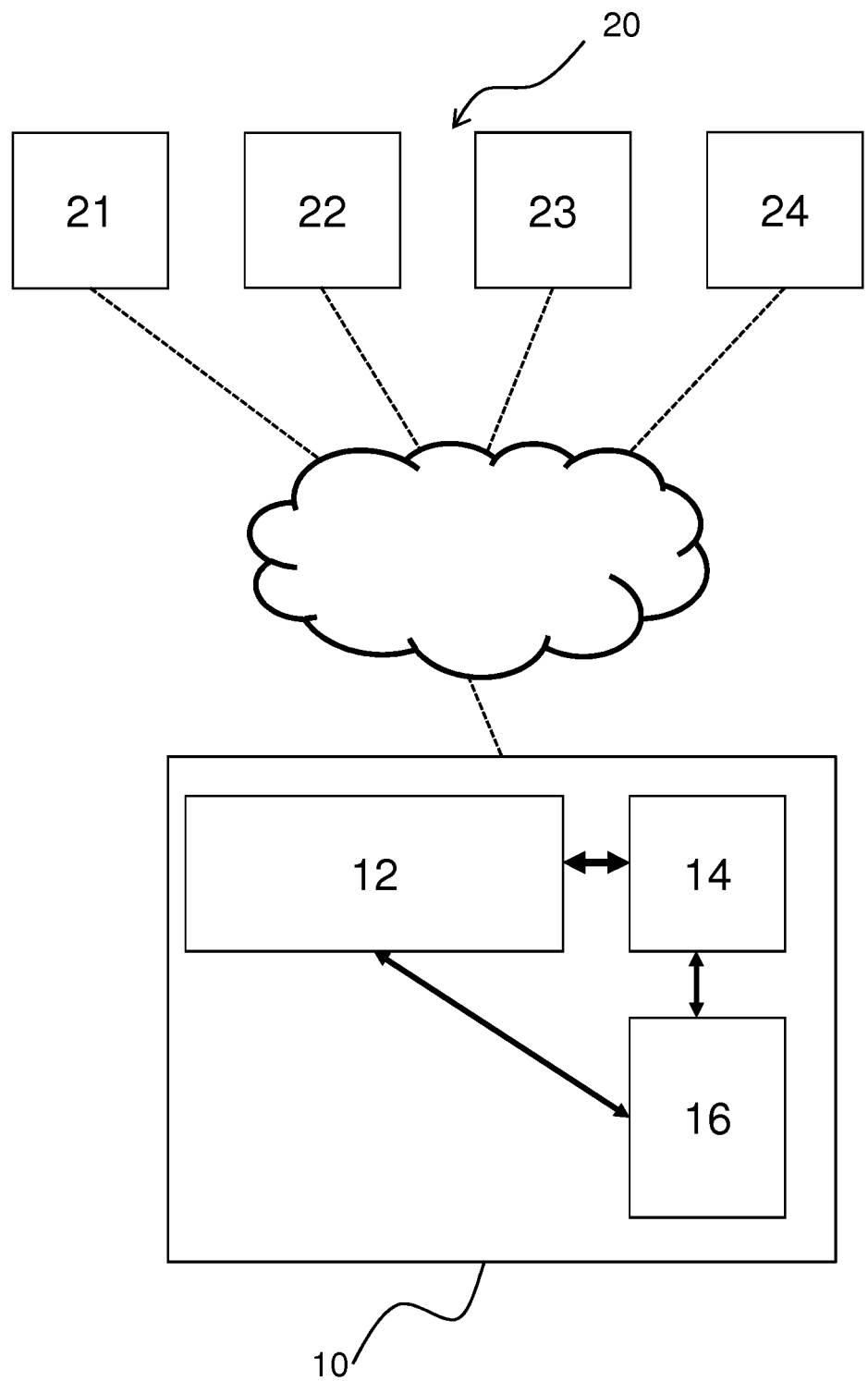
FIG. 3 represents a monitoring system according to the invention.

As illustrated on FIG. 3, the invention also relates to a monitoring system configured for monitoring an optical lens manufacturing process at a first lens manufacturing side.

The monitoring system comprises a sensor network 20 and a monitoring device 10.

The sensor network 20 comprises a plurality of sensors 21, 22, 23, 24 arranged to sense manufacturing data indicative of at least a manufacturing process parameter and/or a manufacturing device parameters and/or an operator parameter and/or an environment parameter at the first lens manufacturing side.

According to an embodiment of the invention the sensors of the sensors network 20 may be set at a plurality of lens manufacturing side. Each lens manufacturing side may comprise the same type of sensors or different type of sensors.

The sensors of the sensor network 20 may comprise communication element allowing them to communicate between them and/or with a distant entity via a communication network as the Internet. The distant entity may be a computing entity such as web servers, files servers, media servers etc. with which the sensors communicate via any of a number of known protocols, such a hypertext transfer protocol (HTTP).

The monitoring device 10 typically corresponds to the monitoring device 10 according to the invention and described previously.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for monitoring an optical lens manufacturing process at a first lens manufacturing side, the method comprising:
a manufacturing data collecting, during which sets of manufacturing data indicative of at least a manufacturing process parameter and/or a manufacturing device parameters and/or measuring device parameter and/or an operator parameter and/or an environment parameter at the first lens manufacturing side are collected;
a manufacturing information generating, during which at least one manufacturing information indicative of at least a manufacturing process parameter and/or a manufacturing device parameters and/or an operator parameter and/or an environment parameter at a second lens manufacturing side is generated based on the collected manufacturing data;
wherein during the manufacturing data collecting sets of manufacturing data are collected from a plurality of lens manufacturing sides;
wherein the manufacturing data further comprise sets of yield data indicative of at least a yield at each manufacturing side and during the manufacturing information generating the at least one manufacturing information is generated based on the collected yield data; and
a target yield providing, during which at least a target of yield of the optical lens manufacturing process at the second lens manufacturing side is provided and during the manufacturing information generating the at least one manufacturing information is generated based on the target yield.

2. The method according to claim 1, wherein the first and second lens manufacturing side are the same.

3. The method according to claim 1, wherein at least part of the manufacturing data collected during the manufacturing data collecting are sensed by a network of sensors at the first manufacturing side.

4. The method according to claim 1, further comprising a manufacturing information processing during which the manufacturing information is processed to generate an alert and/or a recommendation and/or an activation parameter.

5. The method according to claim 4, wherein during the manufacturing information generating the at least one manufacturing information is generated using statistical analysis of the collected manufacturing data and allows to generate an alert and/or a recommendation and/or an activation parameter by anticipation.

6. The method according to claim 4, wherein the manufacturing information processing is realized by using statistical analysis as data mining for pattern detection and/or machine learning and/or artificial intelligence to generate an alert and/or a recommendation and/or an activation parameter by anticipation.

7. The method according to claim 4, wherein the manufacturing information processing is realized by using machine learning including supervised learning, semi-supervised learning, unsupervised learning, or artificial neural network, association rule learning, hierarchical clustering, cluster analysis, or outlier detection.

8. The method according to claim 1, wherein the yield is obtained by comparing a quality parameter, or roughness of the lens, aspect of the lens, or satisfaction of the wearer, with a requirement, a standard, or with predetermined metes and bounds.

9. The method according to claim 1, wherein the yield is a throughput yield measuring ability of the process to produce defect-free units.

10. The method according to claim 1, wherein the yield is a yield to put which indicates rate of return to an investor.

11. The method according to claim 1, further comprising an additional data collecting during which additional data provided by an additional side different from the first and second manufacturing side are collected, and wherein during the manufacturing information generating the additional data is considered when generating the at least one manufacturing information.

12. The method according to claim 11, wherein the additional data is rate of customer satisfaction.

13. A monitoring device configured for monitoring an optical lens manufacturing process at a first lens manufacturing side, the device comprising:
   a communication unit configured to receive from at least a first lens manufacturing side sets of manufacturing data indicative of at least a manufacturing process parameter and/or a manufacturing device parameters and/or an operator parameter and/or an environment parameter at the first lens manufacturing side;
   a memory storing computer executable instructions and configured to store the received sets of manufacturing data;
   a processor for executing the computer executable instructions, wherein the computer executable instructions comprises instructions for processing the manufacturing data to generate at least one manufacturing information indicative of at least a manufacturing process parameter and/or a manufacturing device parameters and/or an operator parameter and/or an environment parameter at a second lens manufacturing side,
   wherein the communication unit is configured to receive data from a plurality of lens manufacturing sides,
   wherein the manufacturing data further comprise sets of yield data indicative of at least a yield at each manufacturing side and the at least one manufacturing information is generated based on collected yield data, and
   wherein the monitoring device further comprises a target of yield of the optical lens manufacturing process at the second lens manufacturing side and the at least one manufacturing information is based on the target yield.

14. The monitoring device according to claim 13, wherein the first and second lens manufacturing side are the same.

15. The monitoring device according to claim 13, wherein the communication unit is further configured to send information data determined by the processor to the second manufacturing side.

16. A lens manufacturing device comprising:
   a monitoring device;
   a sensor configured to sense data indicative of at least one parameter of the lens manufacturing device; and
   a communication module configured to send the sense data indicative of the at least one parameter to said monitoring device,
   wherein said monitoring device is configured to monitor an optical lens manufacturing process at a first lens manufacturing side, said monitoring device comprising:
      a communication unit configured to receive from at least a first lens manufacturing side sets of manufacturing data indicative of at least a manufacturing process parameter and/or a manufacturing device parameters and/or an operator parameter and/or an environment parameter at the first lens manufacturing side;
      a memory storing computer executable instructions and configured to store the received sets of manufacturing data;
      a processor for executing the computer executable instructions, wherein the computer executable instructions comprises instructions for processing the manufacturing data to generate at least one manufacturing information indicative of at least a manufacturing process parameter and/or a manufacturing device parameters and/or an operator parameter and/or an environment parameter at a second lens manufacturing side,
      wherein the communication unit is configured to receive data from a plurality of lens manufacturing sides,
      wherein the manufacturing data further comprise sets of yield data indicative of at least a yield at each manufacturing side and the at least one manufacturing information is generated based on collected yield data, and
   wherein the monitoring device further comprises a target of yield of the optical lens manufacturing process at the second lens manufacturing side and the at least one manufacturing information is based on the target yield.

17. A monitoring system configured for monitoring an optical lens manufacturing process at a first lens manufacturing side, the system comprising:
   a sensor network comprising a plurality of sensors arranged to sense manufacturing data indicative of at least a manufacturing process parameter and/or a manufacturing device parameters and/or an operator parameter and/or an environment parameter at the first lens manufacturing side;
   a monitoring device comprising:
      a communication unit configured to receive from the sensor network sets of manufacturing data indicative of at least a manufacturing process parameter and/or a manufacturing device parameters and/or an operator parameter and/or an environment parameter at the first lens manufacturing side;
      a memory storing computer executable instructions and configured to store the received sets of manufacturing data;
      a processor for executing the computer executable instructions, wherein the computer executable instructions comprises instructions for processing the manufacturing data to generate at least one manufacturing information indicative of at least a manufacturing process parameter and/or a manufacturing device parameters and/or an operator parameter and/or an environment parameter at a second lens manufacturing side, wherein the communication unit is configured to receive data from a plurality of lens manufacturing sides, wherein the manufacturing data further comprise sets of yield data indicative of at least a yield at each manufacturing side and the at least one manufacturing information is generated based on collected yield data, and wherein the monitoring device further comprises a target of yield of the optical lens manufacturing process at the second lens manufacturing side and the at least one manufacturing information is based on the target yield.

18. The system according to claim 17, further comprising a monitoring device configured to send data indicative of the at least one parameter of the lens manufacturing device to a further manufacturing side.

* * * * *